(12) United States Patent
Kobayashi et al.

(10) Patent No.: US 8,116,811 B2
(45) Date of Patent: Feb. 14, 2012

(54) WIRELESS COMMUNICATION CONTROL APPARATUS AND METHOD FOR MOBILE OBJECTS

(75) Inventors: Yuichi Kobayashi, Yokohama (JP); Masamori Kashiyama, Isehara (JP)

(73) Assignee: Hitachi, Ltd., Tokyo (JP)

( * ) Notice: Subject to any disclaimer, the term of this patent is extended or adjusted under 35 U.S.C. 154(b) by 519 days.

(21) Appl. No.: 12/388,073

(22) Filed: Feb. 18, 2009

(65) Prior Publication Data

US 2009/0209282 A1    Aug. 20, 2009

(30) Foreign Application Priority Data

Feb. 18, 2008   (JP) ................................. 2008-035917

(51) Int. Cl.
*H04M 1/00* (2006.01)
(52) U.S. Cl. .................. 455/552.1; 455/553.1
(58) Field of Classification Search ............... 455/552.1, 455/553.1
See application file for complete search history.

(56) References Cited

U.S. PATENT DOCUMENTS

| | | | | |
|---|---|---|---|---|
| 5,951,622 | A | * | 9/1999 | Nomura ........................ 701/212 |
| 5,978,733 | A | * | 11/1999 | Deshimaru et al. ........... 701/209 |
| 2003/0235164 | A1 | | 12/2003 | Rogers et al. |
| 2006/0106534 | A1 | * | 5/2006 | Kawamata et al. ........... 701/208 |
| 2010/0214991 | A1 | | 8/2010 | Luers |
| 2010/0297937 | A1 | * | 11/2010 | Kim ............................. 455/11.1 |

FOREIGN PATENT DOCUMENTS

| | | |
|---|---|---|
| DE | 10 2005 030 796 | 1/2007 |
| EP | 1 460 873 | 9/2004 |
| JP | 2001-230735 | 8/2001 |
| JP | 2006-128914 | 5/2006 |
| JP | 2007-251840 | 9/2007 |

* cited by examiner

*Primary Examiner* — Nick Corsaro
*Assistant Examiner* — Sowmini Nair
(74) *Attorney, Agent, or Firm* — Antonelli, Terry, Stout & Kraus, LLP.

(57) ABSTRACT

According to one aspect of wireless communication control apparatus and method for a mobile object according to the present invention, the wireless communication apparatus and method include the steps of: collecting communication-state information corresponding to positional information of the mobile object for each of a plurality of communication methods that are used to make a connection to a wireless communication device of the mobile object, and that can be selectively set in the wireless communication device; referring to the communication-state information corresponding to the positional information indicating a current position of the mobile object, and selecting one communication method from among the plurality of communication methods that can be selectively set in the wireless communication device; and setting, in the wireless communication device, control information used for communications based on the selected communication method.

24 Claims, 8 Drawing Sheets

FIG. 2

141 COMMUNICATION STATE MAP DATA

| 1410 | 1411 | 1412 | 1413 | 1414 | 1415 | 1416 | 1417 | 1418 |
|---|---|---|---|---|---|---|---|---|
| ROW NUMBER | VEHICLE ID | TIME | COMMUNI-CATION A | COMMUNI-CATION B | LATITUDE | LONGITUDE | MESH CODE | TRANSMISSION STATE |
| 1 | 1234 | 10/10 10:12 | 3Mbps | 0Mbps | 35.27.43 | 139.37.37 | 53391550 | COMPLETED |
| 2 | 1234 | 10/10 10:27 | 1Mbps | 75Mbps | 35.26.25 | 139.34.50 | 53391426 | COMPLETED |
| 3 | 1234 | 10/10 10:42 | 3Mbps | 0Mbps | 35.23.47 | 139.32.16 | 53390473 | UNCOMPLETED |
| .. | .. | .. | .. | .. | .. | .. | .. | .. |

FIG. 3

142 COMMUNICATION-STATE ESTIMATION DATA

| 1420 ROW NUMBER | 1421 VEHICLE ID | 1422 SCHEDULED TIME | 1423 EXPECTED MESH CODE | 1424 COMMUNI-CATION A | 1425 COMMUNI-CATION B | 1426 FEE | 1427 CONNECTION | 1428 COMMUNI-CATION SPEED |
|---|---|---|---|---|---|---|---|---|
| 1 | 1234 | 11/10 15:23 | 53394631 | 3Mbps | 75Mbps | A | A | B |
| 2 | 1234 | 11/10 15:28 | 53394621 | 1Mbps | 75Mbps | A | A | B |
| 3 | 1234 | 11/10 15:33 | 53394611 | 3Mbps | 0Mbps | A | A | A |
| 4 | 1234 | 11/10 15:38 | 53394612 | 0Mbps | 75Mbps | A | B | B |
| .. | .. | .. | .. | .. | .. | .. | .. | .. |

FIG. 8

$$R = \frac{\sum_{i=s}^{g-1} f(i)(t_{i+1}-t_i)}{\sum_{i=s}^{g-1}(t_{i+1}-t_i)}$$

$$f(i) = \begin{cases} 1, v_i \neq 0 \\ 0, v_i \neq 0 \end{cases}$$

WIRELESS COMMUNICATION CONTROL APPARATUS AND METHOD FOR MOBILE OBJECTS

CLAIM OF PRIORITY

The present application claims priority from Japanese application serial no. 2008-35917, filed on Feb. 18, 2008, the content of which is hereby incorporated by reference into this application.

BACKGROUND OF THE INVENTION

The present invention relates to a wireless communication technology for a mobile object, and more particularly to a wireless communication control apparatus, and a wireless communication control method, for a mobile object whose position can be detected.

A mobile communication terminal has a wireless communication function of connecting to a network (wireless communication network) such as a mobile telephone network, and carries out data communications. However, because the wireless communication network does not cover the whole range within which a mobile object moves, the communication speed may decrease, or a communication link may be disconnected, while the mobile object is moving. Therefore, it is difficult to always achieve the excellent communication quality. For the purpose of dealing with this problem, as disclosed in Japanese Patent No. 3567167, the efficiency in communication is improved by identifying an obstacle on the basis of information obtained from an in-vehicle camera to estimate the temporal transition of a communication environment, and by changing values of communication parameters including the data transmission speed, and the packet length in response to a change in communication environment.

SUMMARY OF THE INVENTION

However, the influence exerted on the communication environment is not limited to obstacles. Because there are various causes of the change in communication environment, it was difficult for the conventional mobile communication terminals to correctly estimate a communication environment.

According to one aspect of wireless communication control apparatus and method for a mobile object according to the present invention, the wireless communication apparatus and method include the steps of: collecting communication-state information corresponding to positional information of the mobile object for each of a plurality of communication methods that are used to make a connection to a wireless communication device of the mobile object, and that can be selectively set in the wireless communication device; referring to the communication-state information corresponding to the positional information indicating a current position of the mobile object, and selecting one communication method from among the plurality of communication methods that can be selectively set in the wireless communication device; and setting, in the wireless communication device, control information used for communications based on the selected communication method.

Preferably, when one communication method is selected from a plurality of communication methods, a judgment is made as to whether or not at least one of ratios satisfies a specified condition (for example, a condition in which at least one of ratios is larger than or equal to a specified threshold value, or a condition in which at least one of ratios is the highest, or the lowest, among ratios based on the plurality of communication methods), and then one of the communication methods is selected on the basis of the result of the judgment. In this case, the ratios are a ratio of the communicable time during which communications can be performed by a corresponding communication method in an estimated move path to the moving time during which the mobile object is moving in the estimated move path from a first position (for example, a current position) to a second position (for example, a destination) (for example, a move path estimated by a navigation system), and a ratio of the communicable distance within which communications can be performed by the corresponding communication method in the estimated move path to the moving distance between which the mobile object moves in the estimated move path from the first position to the second position of the mobile object.

As another aspect of the present invention, the plurality of communication methods which can be selectively set in the wireless communication device are a plurality of communication speeds.

As still another aspect of the present invention, the communication-state information indicates that communications based on the communication speed set in the wireless communication device has resulted in either success or failure.

As a further aspect of the present invention, the positional information is a mesh code that indicates a range including a position of the mobile object.

As still a further aspect of the present invention, the communication method is selected according to a policy for the selection of a communication method, the policy being set by a user.

According to the present invention, a communication method corresponding to a current position of the mobile object is selected by use of actually measured data of a communication state corresponding to a position of the mobile object. This makes it possible to ensure a quick and proper response to a change in wireless communication environment.

BRIEF DESCRIPTION OF THE DRAWINGS

These and other features, objects and advantages of the present invention will become more apparent from the following description when taken in conjunction with the accompanying drawings wherein:

FIG. 2 is a diagram illustrating an example of communication state map data;

FIG. 3 is a diagram illustrating an example of communication-state estimation data;

FIG. 8 illustrates equations used to determine a ratio of the time during which it is expected that communications can be performed to a period of time during which a mobile object moves from a current position to a destination.

DESCRIPTION OF THE EMBODIMENTS

A preferred embodiment of the invention is described below with reference to the accompanying drawings. The embodiment of the invention is designed to create a communication state map (collect communication state data) with the use of communication state data measured by a position detector and a wireless communication device both mounted on a mobile object and then to control the wireless communication method of the mobile object based on the communication state map (the collected communication state data).

Figure 1:
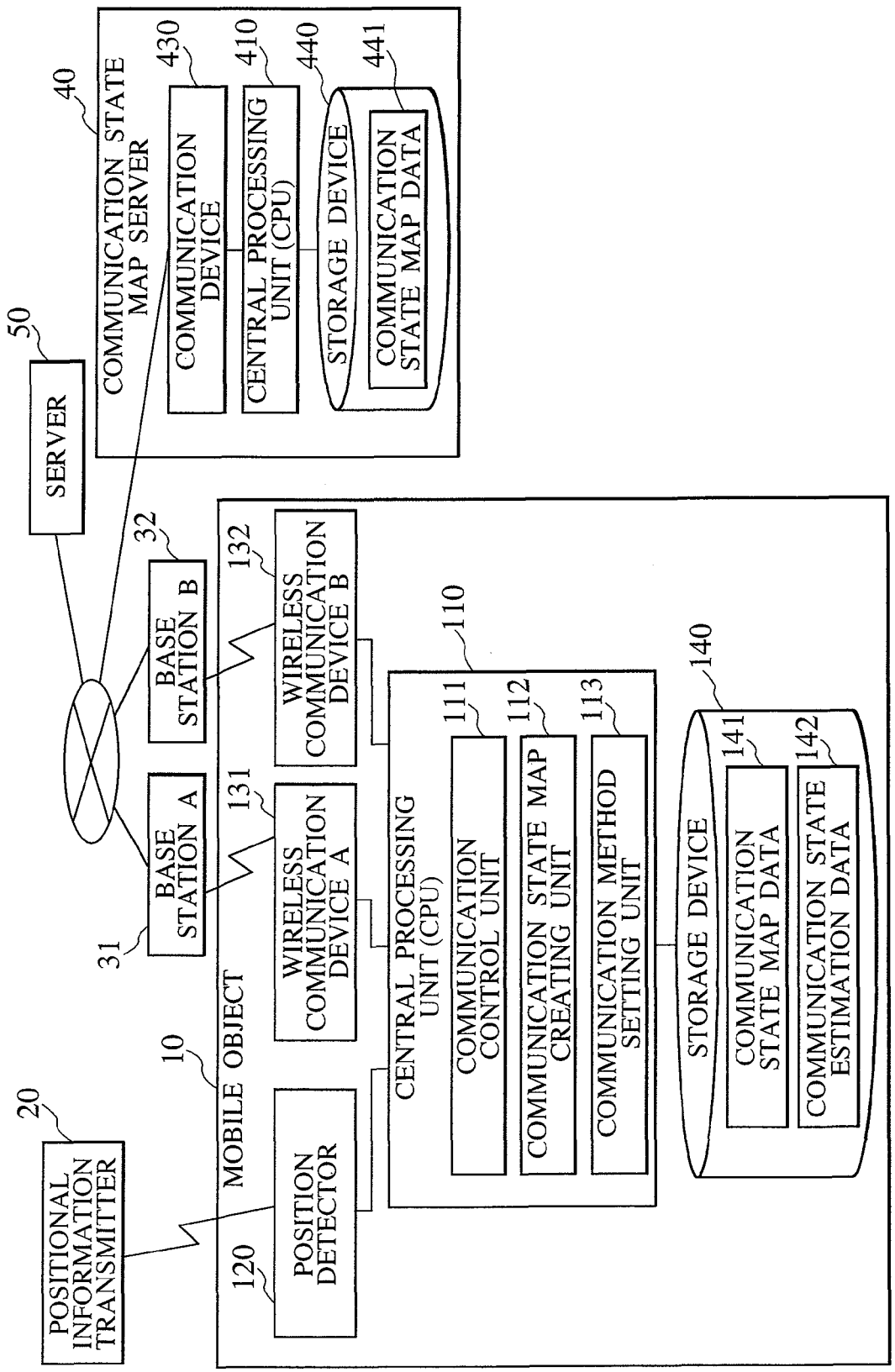
FIG. 1 is a diagram illustrating a configuration of a mobile object wireless communication system.

FIG. 1 illustrates the configuration of the wireless communication system of a mobile object. As shown in the figure, the wireless communication system includes a mobile object 10 capable of communicating while moving; a positional information transmitter 20 for externally transmitting information to the mobile object 10 for the mobile object 10 to detect its own position; and base stations 31 and 32 to which the mobile object 10 connects for wireless communication. The base stations 31 and 32 are connected via a network to a communication state map server 40 and a server 50.

The mobile object 10 can be a car navigation system, a personal navigation device (PND), or a mobile phone, for example. It can also be a vehicle having such wireless communication devices. The positional information transmitter 20 can be one of those provided near the sidewalks of a road, a satellite for a global positioning system (GPS), or an optical beacon. The base stations 31 and 32, also called access points, can be different in kind; for example, one could be a station for mobile phones or PHS (personal handy-phone system) terminals, and the other for a wireless LAN. The communication state map server 40 can be a sever offered by telematics services (the telematics services refer to the integrated services of telecommunications and information services and specifically in Japan to those of the Internet and wireless in-vehicle communication technologies). The communication state map server 40 can also be included in a common ASP (application service provider) server as part of its functions. The server 50 can be a traffic information distribution server, map information distribution server, telematics server, or common ASP server. Because the communication state map server 40 can be the same as the server 50 in physical configuration, the communication state map server 40 may also be referred to simply as a server.

In the explanation that follows, the mobile object 10 is assumed to be a vehicle that has such a wireless communication device as mentioned above and connects in a wireless manner to the communication state map server 40 for wireless communication.

The mobile object 10 includes a position detector 120, wireless communication devices 131 and 132, a storage device 140, and a central processing unit (CPU) 110. The position detector 120 is such a device as detects the position of the mobile object 10 with the use of a signal from the positional information transmitter 20 (such as a GPS or an optical beacon). The position detector 120 can be an autonomous navigation device such as a vehicle speed pulse detector and a gyroscope. The wireless communication devices 131 and 132 are different in kind; for example, one could be a mobile phone or a PHS terminal, and the other a wireless LAN. The storage device 140 is a hard disk drive or a flash memory for storing communication state map data 141. The CPU 110 is connected to the position detector 120, the wireless communication devices 131 and 132, the storage device 140 and other devices not shown; it creates the communication state map data 141 and controls the communication of the mobile object 10. The configuration including the position detector 120, the wireless communication devices 131 and 132, the storage device 140 and the CPU 110 is called a wireless communication control apparatus, and so is the configuration including the storage device 140 and the CPU 110 but excluding the position detector 120 and the wireless communication devices 131 and 132.

The CPU 110 includes a communication state map creating unit (communication states collecting unit) 112; a communication control unit 111; and a communication method setting unit 113. The communication state map creating unit 112 creates the communication state map data 141 indicating communication states of the mobile object 10 at respective geographical locations on the basis of the positional information of the mobile object 10 acquired from the position detector 120 and one or more of the communication states acquired from either or both of the wireless communication devices 131 and 132 and then stores the communication state map data 141 on the storage device 140. The communication control unit 111 selects a communication method for the wireless communication device 131 or 132 or both based on the communication state map data 141 stored on the storage device 140 or based on the communication state map data 441 accumulated in the communication state map server 40. The communication method setting unit 113 sets the communication method selected by the communication control unit 111 for the wireless communication device 131 or 132 or both.

The communication state map server 40 includes a communication device 430 for connection to the network; a storage device 440 such as a hard disk drive for accumulating the communication state map data 441; and a central processing unit (CPU) 410 connected to the communication device 430 and the storage device 440 to manage the communication state map data 441.

The communication state map data 141, the communication state map creating unit (communication state collecting unit) 112, and the communication state map server 40 each include the word "map" in their names because a map is to be displayed on a display unit of the mobile object 10. In this embodiment, those can also be called without the word "map," as in "the communication state data 141," "the communication state collecting unit 112, and "the communication state managing server 40."

Because communication methods (frequency bands, nominal speeds) differ among a mobile phone, a PHS terminal, a wireless LAN (for example, IEEE 802.11), Bluetooth (IEEE 802.15.1), and Ultra wideband, wireless communication devices and base stations for those also differ. For example, the communication methods of mobile phones range from W-CDMA, CDMA2000, to GSM (Global System for Mobile communications); thus, wireless communication devices and base stations for the mobile phones also differ. In this embodiment, a communication method used by the wireless communication device A131 and the base station A31 differs from that used by the wireless communication device 132 and the base station B32. Each of the base station A and the base station B includes multiple base stations so that multiple areas are covered. In addition, if the wireless communication device is a mobile phone or a PHS terminal, the wireless communication device can be built in the mobile object 10 or externally connected to the mobile object 10. If the wireless communication device is externally connected to the mobile object 10, it is desirable that the mobile object 10 include an interface for connection to the wireless communication device.

FIG. 2 is a table illustrating an example of the communication state map data 141. The communication state map data 141 includes the columns of: the row number 1410 of a data row; the vehicle ID 1411 for identifying a mobile object 10; the time 1412 at which the data was recorded; the communication state of the wireless communication method A131 (the communication speed 1413 measured by the wireless communication device A131); the communication state of the wireless communication method B132 (the communication speed 1414 measured by the wireless communication device B132); the latitude 1415 measured by the position detector 120; the longitude 1416 measured by the position detector 120; the mesh code 1417 indicating an area defined by the latitude 1415 and the longitude 1416 (for example, a grid square code defined by JISX0410); and the transmission state 1418 indicating whether or not the data has been transmitted to the communication state map server 40. The mesh code may be of a third regional block (1 km×1 km). However, it is more desirable that the mesh code be of a block whose size is smaller than the third regional block (for example, 200 m×200 m).

Exclusion of the transmission state 1418 from the fields of each row constituting the communication state map data 141 shown in FIG. 2 produces fields of each row constituting the communication state map data 441 that is stored in the storage unit 440 of the communication state map server 40.

FIG. 3 is a diagram illustrating an example of communication-state estimation data 142 that is acquired by collecting a communication state of a wireless communication device at a point at which the mobile object 10 is expected to travel on the basis of movement estimation information of the mobile object 10. The communication-state estimation data 142 is constituted of rows, each of which includes fields of: a row number 1420 indicating a row number of each row constituting the data; a vehicle ID 1421 for identifying the mobile object 10; the estimated time 1422 at which a wireless communication method will be changed; an estimated mesh code 1423 indicating a range within which the mobile object 10 is expected to travel at the estimated time 1422; a communication state of the wireless communication method A corresponding to the estimated mesh code 1423 (communication speed 1424 of the wireless communication device 131); a communication state of the wireless communication method B corresponding to the estimated mesh code 1423 (communication speed 1425 of the wireless communication device 132); a wireless communication method 1426 that complies with a policy which lays stress on the reduction of a communication fee (more specifically, a policy of selecting a wireless communication method whose communication fee is low); a wireless communication method 1427 that complies with a policy which lays stress on the stability of connections (more specifically, a policy of selecting a wireless communication method whose total accessible time is long, or a wireless communication method whose total accessible time satisfies a reference value, and in which the number of times disconnection occurs is small); and a wireless communication method 1428 that complies with a policy which lays stress on the communication speed (more specifically, a policy of selecting a wireless communication method whose communication speed is high). The communication-state estimation data 142 is created by the communication control unit 111 of the central processing unit 110 of the mobile object 10.

A communication fee differs depending on, for example, a wireless communication service provider who provides wireless communications. Each wireless communication service provider determines a fee per unit communication data amount and a fee per unit time. To be more specific, the communication fee differs depending on the classification of a base station (the classification of a communication method). In this embodiment, the communication fee differs depending on which connection is made: more specifically, making a connection to the base station A31 by use of the wireless communication device A131, or making a connection to the base station B32 by use of the wireless communication device B132. The stability of connections differs depending on, for example, a communicable range covered by a base station (if the number of base stations is two or more, the communicable range is covered by the plurality of base stations), and a congestion degree of communications. A connection can be made within the communicable range. However, a connection cannot be made outside the communicable range. According to this embodiment, an actually measured value indicating whether or not a connection can be made is measured at each position. Accordingly, a communicable range can be substantially correctly kept track of. If communications are extremely congested, the communication speed decreases. Further, there is also a possibility that a connection cannot be made. To be more specific, the stability of communication differs depending on the classification of a base station (the classification of a communication method), and depending on a communication state of the base station. The communication speed differs depending on, for example, the nominal speed and a congestion degree of communication. If the nominal speed is low, the communication speed is also low. However, even if the nominal speed is high, congested communication causes the communication speed to decrease. To be more specific, the communication speed also differs depending on the classification of a base station (the classification of a communication method), and depending on a communication state of the base station.

Figure 4:
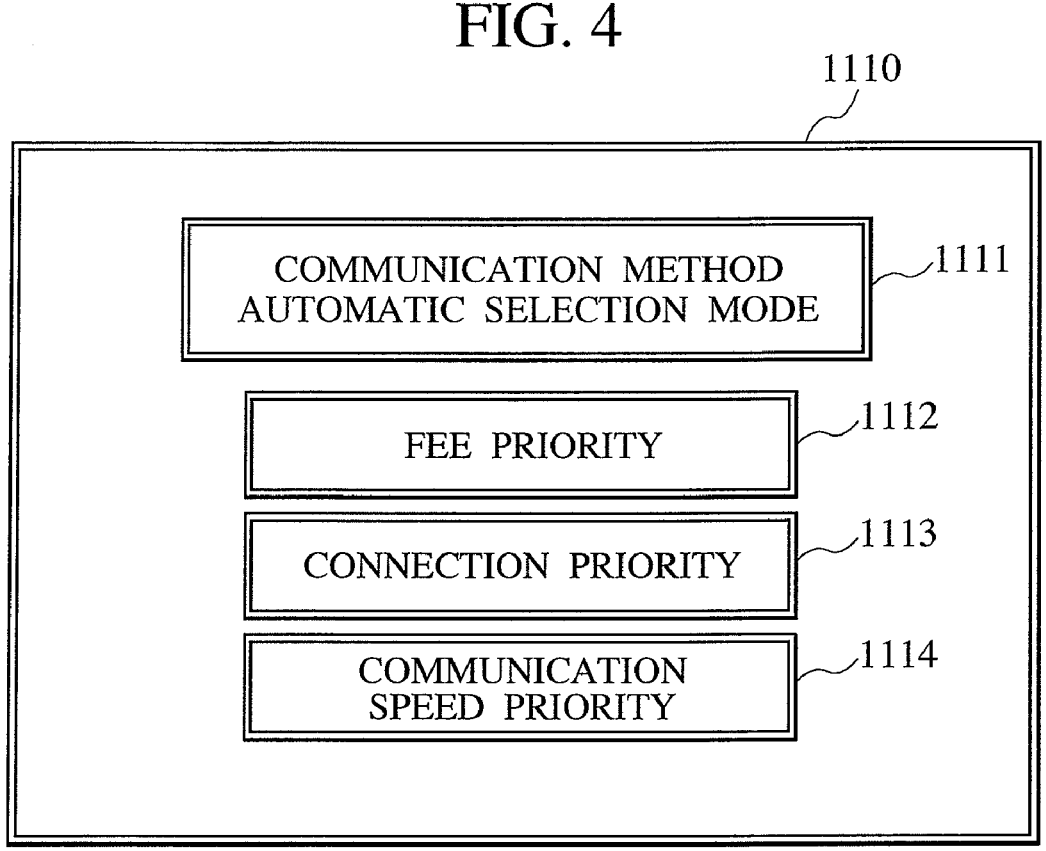
FIG. 4 is a diagram illustrating an example of a policy setting screen.

FIG. 4 is a diagram illustrating an example of a policy setting screen 1110 intended for users, the policy setting screen 1110 allowing a user who operates the mobile object 10 to set a policy of selecting a communication method. It is assumed that policies which can be set by the user are fee priority, connection priority, and communication speed priority. The policy setting screen 1110 displays the following: a "Communication method automatic selection mode" button 1111 that allows the user to select whether or not the communication control unit 111 automatically changes a wireless communication method; a "Fee priority" button 1112 that allows the user to select a communication method when the user lays stress on a lower communication fee; a "Connection priority" button 1113 that allows the user to select a communication method when the user lays stress on the stability of the connection of a communication link; and a "Communication speed priority" button 1114 that allows the user to select a communication method when the user lays stress on the communication speed. These policies are made use of when the communication control unit 111 selects a communication method. In the example shown in FIG. 4, by selecting the "Communication method automatic selection mode" button 1111 to bring this selected button into an ON state, the "Fee priority" button 1112, the "Connection priority" button 1113, and the "Communication speed priority" button 1114 are activated. Only one of the "Fee priority" button 1112, the "Connection priority" button 1113, and the "Communication speed priority" button 1114 can be brought into an ON state when these buttons are activated.

FIG. 8 illustrates equations for determining, on a wireless communication method basis, a ratio of the time during which it is expected that communications can be performed to a period of time during which a mobile object moves from a current position to a destination on the basis of the communication-state estimation data 142 shown in FIG. 3. R is a rate of the communicable time during which it is expected that communications can be performed while the mobile object moves from the current position to the destination. i is a row number (the row number 1420) of a row having the same value of the vehicle ID 1421; s is a row number of a row corresponding to the current position; and g is a row number of a row corresponding to the destination. ti is the estimated time (the estimated time 1422) when a row number is i. Vi is the communication speed (the communication speed 1424 or the communication speed 1425) when a row number is i. A pulse function f is a function of the row number i. If the communication speed is not 0, a value of the pulse function f is 1. If the communication speed is 0, a value of the pulse function f is 0. To be more specific, the communicable time rate R is a ratio of the time during which the mobile object moves through an area in which the communication speed is not equivalent to 0 (in other words, an area in which a connection can be made by a wireless communication method) to the moving time during which the mobile object moves along a move path from the current position to the destination.

Incidentally, as a method for easily determining the communicable time rate R, the communicable time rate R may also be determined by dividing the number of mesh codes from the current position to the destination in which the communication speed is not equivalent to 0 (in other words, the number of communicable mesh codes) by the total number of mesh codes ranging from the current position to the destination on a wireless communication method basis. In this case, the communicable time rate R is a ratio of the distance between which the mobile object moves through an area in which the communication speed is not equivalent to 0 (in other words, an area in which a connection can be made by a wireless communication method) to the moving distance from the current position to the destination along the move path.

Figure 5:
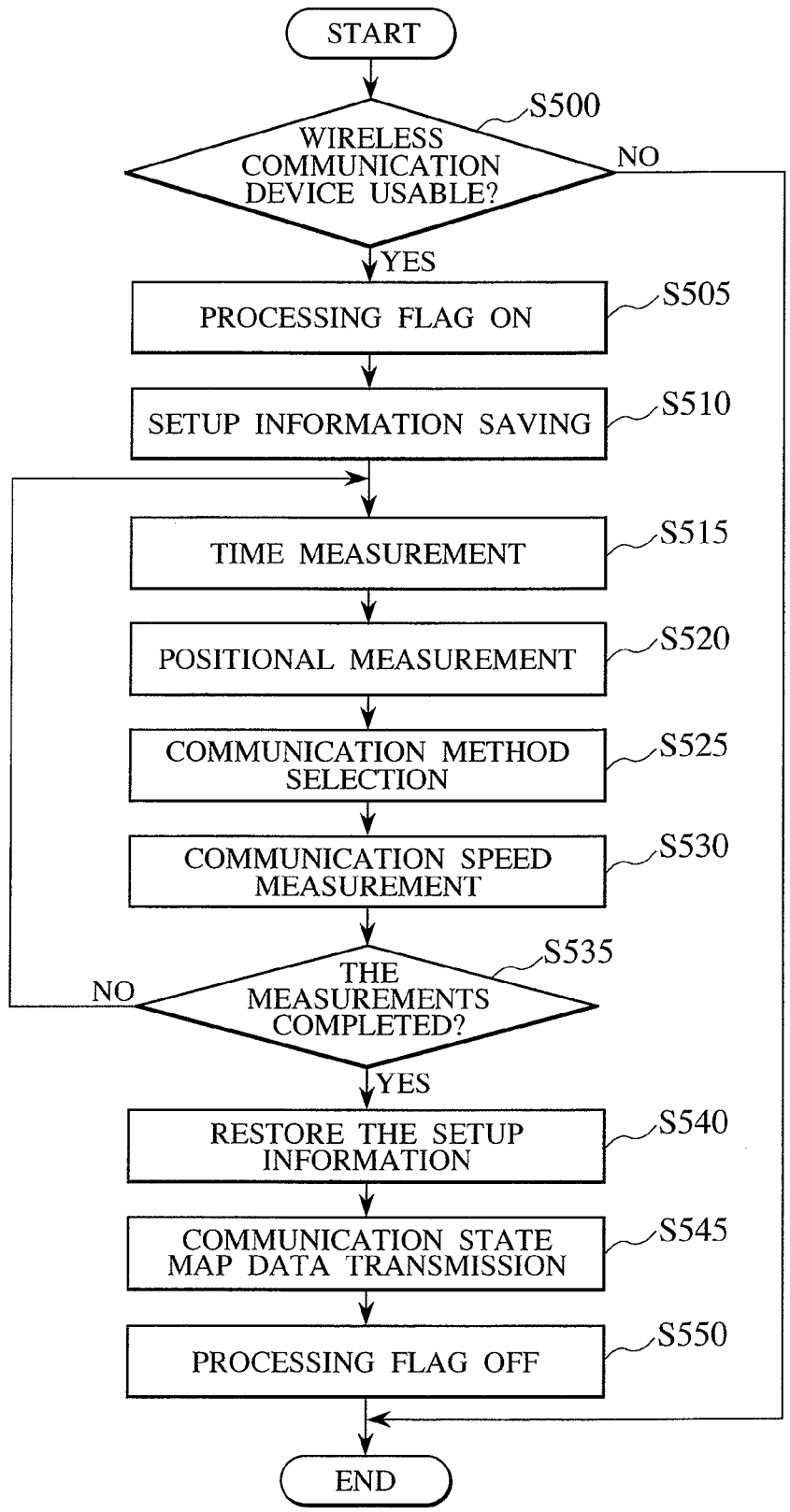
FIG. 5 is a flowchart illustrating a communication state map creating unit.

FIG. 5 is a flowchart illustrating processing of the central processing unit (CPU) 110 included in the mobile object 10 (the communication state map creating unit 112). The communication state map creating unit 112 periodically starts processing by starting a periodical timer. Regular communication processing is processing other than the processing performed by the communication state map creating unit 112. The regular communication processing mainly includes application processing of receive telematics services. Viewing from the communication state map creating unit 112, the undermentioned processing performed by the communication method setting unit 113 also seems to be regular communication processing.

The communication state map creating unit 112 checks whether or not a wireless communication device can be used (S500). If it is judged that the wireless communication device cannot be used, the processing ends. Because the wireless communication device is used for regular communication processing, the communication state map creating unit 112 is forced to share the same wireless communication device. The wireless communication, therefore, must be exclusively controlled. For this reason, a check is made as to whether or not a wireless communication device can be used; and if it is judged that the wireless communication device cannot be used (more specifically, if it is judged that the wireless communication device is being used for regular communication processing, or that the regular communication processing is waiting for permission to use the wireless communication device), the processing ends.

As an example of the exclusive control, a flag is switched ON at the start of regular communication processing; and the flag is then switched OFF at the end of the regular communication processing. As a result, when the flag is in an OFF state, processing of the communication state map creating unit 112 can be executed. Even when a communication error occurs in the regular communication processing, the communication state map creating unit 112 starts the processing thereof. Accordingly, when a communication error occurs, the regular communication processing switches OFF the flag, before the regular communication processing ends. When the communication state map creating unit 112 starts the processing thereof, the execution of the regular communication processing is forced to be in a waiting state. In order to avoid such a situation, there is provided a flag indicating that the regular communication processing is waiting for use. If the use-waiting flag is in an ON state, the use by the communication state map creating unit 112 is disallowed.

If there are a plurality of wireless communication devices, the communication state map creating unit 112 can execute the processing thereof by use of a wireless communication device that is not being used by the regular communication processing. In this case, whether or not a wireless communication device can be used may also be checked on the basis of the selection of a communication method.

When the regular communication processing is continuously executed, the execution of the communication state map creating unit 112 is disallowed. However, this situation shows that the excellent communication quality is ensured by a communication method set for the regular communication processing at this point of time.

If the use of a wireless communication device is allowed, it is necessary to prevent the regular communication processing from starting during the execution of the communication state map creating unit 112. Therefore, a processing flag is provided, and it is switched ON (S505). If the processing flag is ON, the regular communication processing is disallowed to use the wireless communication device.

When the communication state map creating unit 112 starts the processing thereof, various kinds of parameters of a communication method (used for the regular communication processing), which are set in a wireless communication device, are saved (S510). These parameters are saved for the purpose of restoring the communication method set in the wireless communication device when the communication state map creating unit 112 ends the processing thereof. Although the various kinds of parameters differ depending on a wireless communication device, most of them are set in a control register of the wireless communication device. Because data stored in the control register is often copied to a storage unit, the copied data has only to be stored in a save area of the storage unit.

The time is measured, and the measured time data is then stored in a "time" field 1412 of the communication state map data 141. An identifier of the mobile object 10 is stored in a "vehicle ID" field 1411; and "uncompleted" is stored in a "transmission state" field 1418 (S515). Here, the description below is based on the assumption that the communication speed based on each of two or more kinds of communication methods is measured at the same time of day, and at the same position (in actuality, because the measurement result is influenced by the length of time taken by the measurement processing and the move of the mobile object, the communication speed is measured nearly at the same time of day, and nearly at the same position), and is then collected as data.

While the communication speed is measured based on each of the plurality of communication methods, if there is a possibility that data cannot be regarded as data acquired at the same time of day, the data is compared with the latest "time" data 1412 stored in the communication state map data 141 shown in FIG. 2 so as to judge whether or not the measured time of day can be regarded as the latest time of day. If it is judged that the measured time of day cannot be regarded as the latest time of day, the measured time data is stored in the "time" field 1412 of a new row of the communication state map data 141. If the time data has been stored, the row in which the time data has been stored becomes a row storing the latest time data. Other data is stored in the other fields of the row storing the latest time data. Because there is a possibility that data will not be stored in the other fields thereafter, null data or initial value data is stored if necessary. Data of "uncompleted" is stored in the "transmission state" field 1418. By handling data in this manner, the data is stored in a new row of the communication state map data 141 with the lapse of time.

Positional information is acquired by the position detector 120, and the acquired data is then stored in a "latitude" field 1415, a "longitude" field 1416, and a "mesh code" field 1417 included in the communication state map data 141 (S520). Because the correspondence between the acquired positional information and data to be stored is well known, the description thereof will be omitted. Incidentally, because the latitude and longitude are in correspondence with the mesh code, either of them may also be acquired.

If the communication quality is influenced only by obstacles such as geographical features and buildings, the time data is not required. In this case, the positional information and the undermentioned communication method (the communication quality indicated by a data transmission rate) are managed with both of them associated with each other. However, the quality of wireless communications is influenced not only statically but also dynamically because of time factors including the daytime, the nighttime, and a season (fluctuations in position of a celestial body). Therefore, data is associated with time data here.

A communication method of the wireless communication device 131 or 132 disposed in the mobile object 10 is selected (S525). If each of the two wireless communication devices 131, 132 allows settings of one of two kinds of data transmission rates, and one of two kinds of modulation methods, the number of combinations of communication methods is eight. Therefore, selection is successively performed in each combination. It may also be so configured that a data transmission rate, a modulation method, and the like, can be set for one wireless communication device. Here, in order to simplify the description, it is assumed that two wireless communication devices are provided, and that a data transmission rate of the wireless communication device 131 can be selected between 3 Mbps and 1 Mbps, whereas a data transmission rate of the wireless communication device 132 is fixed to 75 Mbps. Further, it is also assumed that other factors such as a modulation method cannot be selectively set. In this case, therefore, the number of selectable communication methods is three. In FIGS. 2 and 3, a communication method used by the wireless communication device 131 is shown as the communication A 1413, whereas a communication method used by the wireless communication device 132 is shown as the communication B 1414. The table shown in FIGS. 2 and 3 may also be so configured that the number of communication methods used by the wireless communication device 131 is two or more (in this case, two) on the basis of a data transmission rate. In particular, if a point relating to the undermentioned policy set by a user differs (for example, even if the same wireless communication device is used, a fee structure differs depending on a data transmission rate), the table is configured on the basis of each different communication method.

Next, the communication state map creating unit 112 measures the communication speed by use of the selected communication method (S530). The measurement of the communication speed described here means detection of whether or not communication by the selected communication method has been successfully performed.

As an example of the measurement of the communication speed, a case where the wireless communication device 131 is configured to operate at a data transmission rate of 1 Mbps will be described. Test data in a specified format is prepared. It is so configured that the mobile object 10 transmits this test data to a base station at a data transmission rate of 1 Mbps by the wireless communication device 131, and that the test data loops back from the base station, and then returns to the mobile object 10. The above configuration can be achieved by, for example, inserting information indicating the test data into a header portion of the test data in the specified format. The communication speed is measured by transmitting test data, and by judging whether or not the looped back test data has been successfully received. Even if a bit error occurs in the test data, the wireless communication device 131 executes bit-error correction, and retransmission of the test data, at a lower protocol level (for example, a data link layer). As a result, the wireless communication device 131 notifies the CPU (the communication state map creating unit) of the success or failure in the receipt of the test data.

Here, in order to increase the accuracy of measurement, test data is repeatedly transmitted the specified number of times to determine a success probability from the number of times the test data has been successfully received. If the success probability is higher than or equal to a specified success probability, the receipt of the test data is judged to be successful. As another method, successfully received test data is collated with the transmitted test data to determine a bit error rate. If the error correction and retransmission are not executed at a lower protocol level, this method is effective. However, in general, if the test data has been successfully received as a result of the execution of the error correction and retransmission, the received test data does not include an error bit. Therefore, this method is not effective.

As described above, if the communication results in success, the set data transmission rate ("1 Mbps") is stored in the "communication A" field 1413 of the communication state map data 141 shown in FIG. 2. In contrast, if the communication results in failure, "0 Mbps" is stored in the "communication A" field 1413. As described above, "3 Mbps" can also be selected for the wireless communication device 131 as a data transmission rate. If the above-described conditions (at the same time of day, and at the same position) are satisfied, the "communication A" field 1413 of the communication state map data 141 is overwritten as a result of successful communication. Accordingly, when a communication method whose data transmission rate is lower (1 Mbps) is selected earlier, if the communication results in failure at a data transmission rate of 3 Mbps, "1 Mbps" is kept stored. By keeping this data just as it, the best data transmission rate remains as recorded data.

A judgment is made as to whether or not all of the available communication speed of all settable communication methods has been measured (S535). If there is a communication method that has not been measured, the process returns to the step S515. If it is judged that all of the available communication speed of all settable communication methods has been measured, the various kinds of parameters of the communication method of the wireless communication device saved in the step S510 is restored (S540).

The communication state map data 141 in which "uncompleted" is stored in the "transmission state" field 1418 is transmitted to the communication state map server 40. After that, "completed" is stored in the "transmission state" field 1418 (S545). The communication method used when the communication-state map data 141 is transmitted to the communication-state map server 40 is the communication method restored in the step S540. The processing flag is switched OFF (S550), before the process ends.

Figure 6:
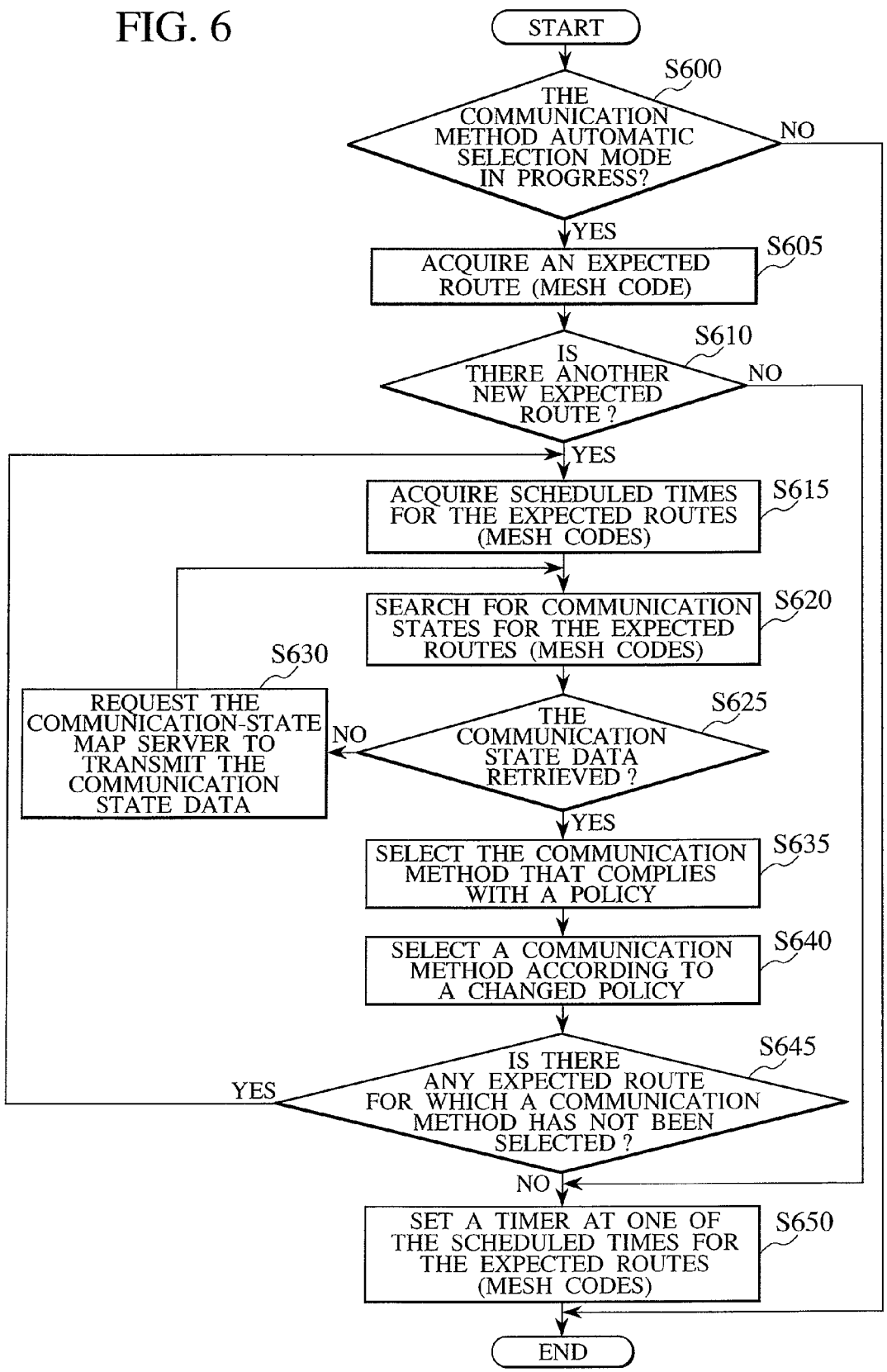
FIG. 6 is a flowchart illustrating a communication control unit.

FIG. 6 is a flowchart illustrating processing of the central processing unit 110 included in the mobile object 10 (the communication control unit 111). The communication control unit 111 starts processing periodically or in response to the occurrence of a communication error in the regular communication processing. In addition, the communication control unit 111 may also be so controlled to start processing on the completion of the processing of the communication state map creating unit 112.

According to user settings made through the policy setting screen 1110, the communication control unit 111 checks whether a current mode is a mode in which a communication method is automatically changed or a mode in which the communication method is manually changed (S600). If it is judged that the current mode is the manual change mode, the process ends.

The communication control unit 111 acquires an estimated mesh code indicating an estimated traveling route (mesh code) of the mobile object 10 from a current position to a destination (S605). For example, the destination can be acquired from a position (latitude, and longitude) of a destination that has been inputted into a car navigation system by a user, and that has been stored in the car navigation system. The estimated traveling route is acquired from the result of a route search made in the car navigation system. A judgment is made as to whether or not there is a new estimated traveling route (mesh code) for which a communication method has not been selected (S610). If it is judged that there is no new estimated traveling route (mesh code), the process proceeds to a step S650. If it is judged that there is a new estimated traveling route (mesh code), it means that in a period from the last time to this point of time, a route search for a new destination has been made, or a route search has been made because the mobile object 10 has traveled through a different route.

The communication control unit 111 acquires the estimated time at which the mobile object 10 is expected to travel through (enter) an area corresponding to the acquired estimated mesh code (S615). To be more specific, the communication control unit 111 acquires the estimated time on the basis of positional information, a traveling direction, and speed information received from the position detector 120. The estimated time acquired here, and the mesh code paired therewith, correspond to the estimated time 1422 and the estimated mesh code 1423 included in the communication-state estimation data 142 shown in FIG. 3 respectively.

The communication control unit 111 searches the mesh code 1417 of the communication-state map data 141 for the estimated mesh code acquired in the step S605, and thereby acquires a communication state (the communication speed 1413 and 1414) corresponding to the estimated mesh code (S620). The acquired communication state (the communication speed 1413 and 1414) is stored as a communication state (the communication speed 1424 and 1425) in the communication-state estimation data 142 shown in FIG. 3. If a plurality of mesh codes corresponding to the estimated mesh code have been found from the communication-state map data 141, a communication state whose time is close to the estimated time acquired in the step S615 is acquired. Moreover, if a plurality of mesh codes have been found at the time that is close to the estimated time acquired in the step S615, communication state data whose time is the newest is acquired.

If no mesh code corresponding to the estimated mesh code has been found from the communication-state map data 141 (S625), the communication-state map server 40 is requested to transmit the communication-state map data (S630). As request parameters, this request is attached with an estimated mesh code, the estimated time acquired in the step S615, and information indicating a selectable communication method for the mobile object 10. The communication-state map server 40 searches the communication-state map data 441 for data corresponding to the request parameters attached to the request, and then transmits the data to the mobile object 10. The received data is added to the communication-state map data 141. The process then returns to the step S620.

The communication-state map server 40 acquires the communication-state map data 141 from the plurality of moving bodies 10 (by the processing in the step S545 shown in FIG. 5). Next, the communication-state map server 40 sorts the communication-state map data 141 by, for example, "mesh code" or "time" to store the sorted data in the storage unit 440 as the communication-state map data 441. The communication-state map server 40 then executes processing according to a request as described in the step S630. A detailed description of the processing will be omitted.

On the basis of these communication states (the communication speed 1424 and 1425), the wireless communication method 1426 that complies with a policy which lays stress on fees, the wireless communication method 1427 that complies with a policy which lays stress on the connectivity, and the wireless communication method 1428 that complies with a policy which lays stress on the communication speed are selected (S635). Reference values of communicable time rates (for example, 80%, 50%, 0%), and fee information for each wireless communication method, are stored in the storage unit 140. The reference values of the communicable time rates may also be set on a policy basis.

When the wireless communication method 1426 that complies with the policy which lays stress on fees is used, the communication control unit 111 executes processing including the steps of: calculating a communicable time rate on a wireless communication method basis by use of the equations shown in FIG. 8; on a wireless communication method basis, making a judgment as to whether or not the communicable time rate is higher than or equal to a reference value; extracting a wireless communication method whose communicable time rate is higher than or equal to the reference value; extracting fee information corresponding to the wireless communication method whose communicable time rate is higher than or equal to the reference value; comparing the pieces of fee information to select a wireless communication method whose fee is the lowest; and storing the selected wireless communication method in the "fee" fields 1426 corresponding to all estimated mesh codes ranging from a current position to a destination included in the communication-state estimation data 142 shown in FIG. 3. If the communication control unit 111 judges that there is no wireless communication method whose communicable time rate is higher than or equal to the reference value, the communication control unit 111 stores a code "no wireless communication method" in the "fee" fields corresponding to all estimated mesh codes ranging from the current position to the destination included in the communication-state estimation data 142 shown in FIG. 3. In addition, if the communicable time rate is higher than or equal to the reference value, and if a plurality of wireless communication methods each specifying the same fees are extracted, the communication control unit 111 may also compare communicable time rates among the plurality of wireless communication methods to store a wireless communication method whose communicable time rate is high in the "fee" fields corresponding to all estimated mesh codes ranging from the current position to the destination included in the communication-state estimation data 142 shown in FIG. 3, or the communication control unit 111 may also compare the communication speed among the plurality of wireless communication methods to store a wireless communication method whose communication speed is high in the "fee" fields corresponding to all estimated mesh codes ranging from the current position to the destination included in the communication-state estimation data 142 shown in FIG. 3. For example, on the assumptions that a reference value is 80%, and that a row number 1 shown in FIG. 3 is a current position, whereas a row number 4 is a destination, row numbers 2, 3 exist on a move path between the current position and the destination. If a communication fee of the communication A is lower than that of the communication B, a communicable time rate R of the communication A is 100%, whereas a communicable time rate R of the communication B is 66%, which are calculated by the equations shown in FIG. 8. Therefore, "A" is stored to in the "fee" field 1426 over a mesh code range (ranging from the row number 1 to the row number 4 in the communication-state estimation data 142 shown in FIG. 3. Incidentally, in the above example, the same wireless communication method is assigned to all mesh codes ranging from the current position to the destination. However, a wireless communication method may also be assigned to each mesh code by performing the above-described selection processing of a wireless communication method on a mesh code basis.

When the wireless communication method 1427 that complies with the policy which lays stress on the connectivity is used, the communication control unit 111 executes processing including the steps of: on a mesh code basis, and on a wireless communication method basis, referring to the communication-state map data 141 shown in FIG. 2 to judge whether or not the communication speed is 0 Mbps (if the communication speed is 0 Mbps, the connection is not allowed; and if the communication speed is not 0 Mbps, the connection is allowed); extracting, on a mesh code basis, a wireless communication method whose communication speed is not 0 Mbps; and storing the wireless communication method whose communication speed is not 0 Mbps in the "connection" field 1427 included in the communication-state estimation data 142 shown in FIG. 3 on a mesh code basis. If a wireless communication method whose communication speed is not 0 Mbps cannot be extracted, the communication control unit 111 stores a code "no wireless communication method" in a corresponding "connection" field included in the communication-state estimation data 142 shown in FIG. 3. The connectivity means whether or not a connection can be made for a corresponding mesh code. Next, if a plurality of wireless communication methods whose communication speed is not 0 Mbps could be extracted, the communication control unit 111 may also store all of the plurality of wireless communication methods whose communication speed is not 0 Mbps in corresponding "connection" fields included in the communication-state estimation data 142 shown in FIG. 3, or the communication control unit 111 may also compare the communication speed among the plurality of wireless communication methods whose communication speed is not 0 Mbps to select a wireless communication method whose communication speed is the lowest (the highest), so that the wireless communication method whose communication speed is the lowest (the highest) is stored in a corresponding "connection" field included in the communication-state estimation data 142 shown in FIG. 3. For example, if a wireless communication method whose communication speed is the lowest is selected, because the communication speed of the communication A in the row number 1 of the communication-state estimation data 142 shown in FIG. 3 is low, "A" is stored in the "connection" field. In like manner, because the communication speed of the communication A in the row number 2 is low, "A" is stored in the "connection" field. Next, in the row number 3, because the communication speed of the communication A is not 0 Mbps, whereas the communication speed of the communication B is 0 Mbps, "A" is stored in the "connection" field. In the row number 4, because the communication speed of the communication A is 0 Mbps, whereas the communication speed of the communication B is not 0 Mbps, "B" is stored in the "connection" field.

As another example of the wireless communication method 1427 that complies with a policy which lays stress on the connectivity, a communicable time rate may also be used. To be more specific, the communication control unit 111 uses the equations shown in FIG. 8 to calculate a communicable time rate on a wireless communication method basis, and then stores a wireless communication method whose communicable time rate is the highest in the "connectivity" fields corresponding to all estimated mesh codes ranging from the current position to the destination included in the communication-state estimation data 142 shown in FIG. 3.

When the wireless communication method 1428 that complies with the policy which lays stress on the communication speed is used, the communication control unit 111 executes processing including the steps of: with reference to the communication-state map data 141 shown in FIG. 2, comparing the communication speed on a mesh code basis, and selecting, on a mesh code basis, a wireless communication method whose communication speed is high; and storing the wireless communication method whose communication speed is not 0 Mbps in the "communication speed" field 1428 included in the communication-state estimation data 142 shown in FIG. 3 on a mesh code basis. For example, because the communication speed of the communication B is higher than that of the communication A in the row numbers 1, 2, 4 of the communication-state estimation data 142 shown in FIG. 3, the communication B is selected, and "B" is stored in the " communication speed" field 1428. In contrast, because the communication speed of the communication A is higher than that of the communication B in the row number 3, the communication A is selected, and "A" is stored in the "communication speed" field 1428.

Incidentally, in order to enable communications from the current position, the above-described selection processing of selecting a wireless communication method may also be provided with processing of judging whether or not a connection can be made for a mesh code of the current position. Incidentally, in order to enable communications from a certain position, the above-described selection processing of selecting a wireless communication method may also be provided with processing of judging whether or not a connection can be made for a mesh code of the certain position. In addition, it is not necessary to perform calculation covering the whole move path from the current position to the destination. A wireless communication method may also be selected within a range of specified distance from the current position in the move path (for example, within a range of 10 km), or within a range of the specified moving time from the current position along the move path (for example, within a range of 30 minutes), or within a range of the specified number of mesh codes from the current position in the move path (for example, within a range of five). In this case, in the processing described above, if a mesh code of the specified distance, a mesh code of the specified moving time, and a specified mesh code are used instead of a mesh code of the destination, a wireless communication method can be selected.

The communication control unit 111 selects a wireless communication method that complies with a policy set by a user, as described with reference to FIG. 4 (S640) For example, if the user sets the policy which lays stress on fees, the communication A is selected over a mesh code range from the row number 1 to the row number 4 shown in FIG. 3. In a mesh code range of the row numbers 1, 3, 4, a communication method in which a data transmission rate of 3 Mbps is set for the wireless communication device A is selected. In a mesh code range of the row number 2, a communication method in which a data transmission rate of 1 Mbps is set for the wireless communication device A is selected. Moreover, if a user sets a policy of the connection priority, in a mesh code range of the row numbers 1, 3, a communication method in which a data transmission rate of 3 Mbps is set for the wireless communication device A is selected. In the mesh code range of the row number 2, a communication method in which a data transmission rate of 1 Mbps is set for the wireless communication device A is selected. In a mesh code range of the row number 4, a communication method of the wireless communication device B (a data transmission rate is 75 Mbps, which is a fixed value) is selected. Although illustration of the selection result is omitted, the selection result is stored in the storage unit 140 corresponding to each row number of the communication-state estimation data 142 shown in FIG. 3.

A check is made as to whether or not the selection of a communication method has been completed for each row number of the communication-state estimation data 142 (S645). If it is judged that the selection has not been completed yet, the process returns to the process S615. If it is judged that the selection has been completed, a timer is set at a value of the estimated time 1422 that is after the current time, and that is the closest to the current time (S650). The value is selected from among pieces of estimated time data, each of which corresponds to each row number of the communication-state estimation data 142 shown in FIG. 3. This timer causes the communication method setting unit 113 described below to start at the set time.

Figure 7:
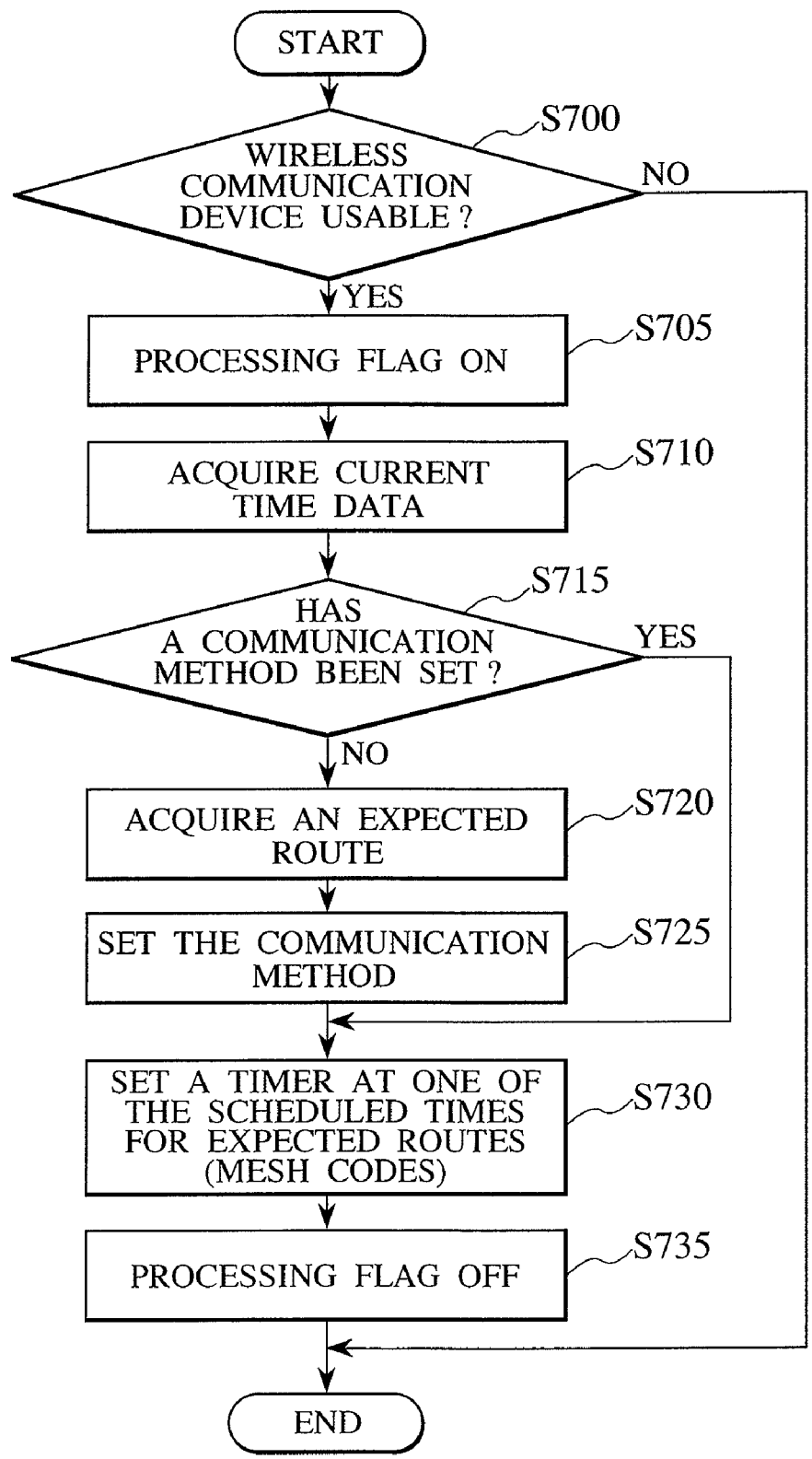
FIG. 7 is a flowchart illustrating processing of a communication method setting unit.

FIG. 7 is a flowchart illustrating processing of the communication method setting unit 113. Because the communication method setting unit 113 changes settings of a wireless communication unit, if the execution of the communication method setting unit 113 is started while the wireless communication unit executes regular communication processing, the regular communication processing will result in an error. For this reason, exclusive control is required between processing of the communication method setting unit 113 and the regular communication processing. In this example, how to check whether or not a wireless communication device can be used based on the exclusive control (S700), and how to control the processing flag (S705, S735), are the same as the methods described in the steps S500, S505, S550 shown in FIG. 5. Therefore, a description of the exclusive control will be omitted here.

The current time is acquired (S710). A check is made as to whether or not a communication method corresponding to the communication-state estimation data 142 whose traveling estimated time 1422 is the newest but is older than the acquired current time has already been set in a wireless communication device (S715). If it is judged that the communication method described above has already been set in the wireless communication device, the process proceeds to a step S730. If it is judged that the communication method described above has not been set in the wireless communication device, an estimated traveling route (mesh code) is acquired (S720). Although a detailed description will be omitted, a reason why an estimated traveling route (mesh code) is acquired is to check whether or not the mobile object is currently traveling through the estimated traveling route (mesh code) acquired here.

Various kinds of parameters are set in the wireless communication device according to a communication method corresponding to an estimated traveling route (mesh code) (corresponding to the communication-state estimation data 142 determined with reference to the current time) (S725). If the number of wireless communication devices is one, settings of various kinds of parameters in a control register, or the like, make it possible to operate the wireless communication device according to the selected communication method. The parameters (control information) to be set in the control register, or the like, include not only a data transmission rate of the wireless communication device, but also: the number of times retransmission is performed, which is used by a lower level protocol (the data link layer, the network layer, or the like); classification of an error correction code used for the bit error detection and correction; and the timeout time used when waiting for a response. There is also a wireless communication device capable of selecting a modulation method, or a wireless communication device capable of selecting a carrier frequency. Accordingly, selection information used for the selection is also handled as a parameter. If the number of wireless communication devices is two or more, one must be selected from the plurality of wireless communication devices. As one of easy methods, information about a selected wireless communication device is stored in the storage unit 140; and when regular communication processing is executed, the selected wireless communication device is used with reference to this information.

A timer is set at a value of the estimated time 1422 that is after the current time, and that is the closest to the current time (S730). The value is selected from among pieces of estimated time data, each of which corresponds to each row number of the communication-state estimation data 142 shown in FIG. 3. This timer causes the communication method setting unit to start again at the set time.

According to the embodiment described above, a communication method corresponding to a current position of the mobile object is selected by use of actually measured data of a communication state corresponding to a position of the mobile object. This makes it possible to ensure a quick and proper response to a change in wireless communication environment. Other advantages of this embodiment will be understood from the above description.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. A wireless communication control apparatus for a mobile object having a wireless communication device, the apparatus comprising:
    a storage device for storing the communication state information correlated with the positional information indicating the current position of the mobile object;
    a communication state collecting unit connected to the wireless communication device of the mobile object, the communication state collecting unit being adapted to collect the communication state information for each of multiple communication methods that can be selectively set for the wireless communication device and then store the collected communication state information in the storage device;

a communication control unit for selecting one communication method from among the multiple communication methods with reference to the communication state information stored in the storage device; and a communication method setting unit for setting control information for the wireless communication device, the control information being used for the communication according to the one communication method selected.

2. The wireless communication control apparatus according to claim 1, wherein the communication control unit selects the one communication method from among the multiple communication methods based on a judgment as to whether or not at least either of two ratios meets a predetermined condition, one of the two ratios being the ratio of the communicable time during which communication is possible with each of the multiple communication methods on the expected traveling path of the mobile object from a first geographical location to a second geographical location to the traveling time required for the mobile object to travel the expected traveling path, the other of the two ratios being the ratio of the communicable distance within which communication is possible with each of the multiple communication methods on the expected traveling path of the mobile object from the first geographical location to the second geographical location to the traveling distance of the mobile object on the expected traveling path.

3. The wireless communication control apparatus according to claim 2, wherein the multiple communication methods are multiple communication speeds.

4. The wireless communication control apparatus according to claim 3, wherein the communication state information indicates that the communication at a communication speed set for the wireless communication device is either successful or unsuccessful.

5. The wireless communication control apparatus according to claim 4, wherein the positional information is a mesh code or grid square code indicating an area in which the mobile object is located.

6. The wireless communication control apparatus according to claim 5, wherein the communication control unit selects the one communication method from among the multiple communication methods based on the communication method selection policy set by a user.

7. The wireless communication control apparatus according to claim 5, wherein the communication state collecting unit transmits the collected communication state information to a communication state managing server via a wireless network with the use of the wireless communication device for which the control information has been set by the communication method setting unit.

8. The wireless communication control apparatus according to claim 7, wherein the communication control unit demands acquisition of the communication state information correlated with the positional information indicating the current position of the mobile object from the communication state managing server when the communication state information is not stored in the storage device.

9. A wireless communication control apparatus for a mobile object, the apparatus comprising:

a wireless communication device for conducting wireless communication with a server via a network;

a storage device for storing the communication state information correlated with the positional information indicating the current position of the mobile object;

a position detector for detecting the current position of the mobile object; and a processing unit connected to the wireless communication device, the storage device, and the position detector, the processing unit being adapted to perform the steps of:

collecting the communication state information for each of multiple communication methods that can be selectively set for the wireless communication device and then storing the collected communication state information in the storage device;

selecting one communication method from among the multiple communication methods with reference to the collected communication state information; and setting control information for the wireless communication device, the control information being used for the communication according to the one communication method selected.

10. The wireless communication control apparatus according to claim 9, wherein the processing unit selects the one communication method from among the multiple communication methods based on a judgment as to whether or not at least either of two ratios meets a predetermined condition, one of the two ratios being the ratio of the communicable time during which communication is possible with each of the multiple communication methods on the expected traveling path of the mobile object from a first geographical location to a second geographical location to the traveling time required for the mobile object to travel the expected traveling path, the other of the two ratios being the ratio of the communicable distance within which communication is possible with each of the multiple communication methods on the expected traveling path of the mobile object from the first geographical location to the second geographical location to the traveling distance of the mobile object on the expected traveling path.

11. The wireless communication control apparatus according to claim 10, wherein the multiple communication methods are multiple communication speeds.

12. The wireless communication control apparatus according to claim 11, wherein the communication state information indicates that the communication at a communication speed set for the wireless communication device is either successful or unsuccessful.

13. The wireless communication control apparatus according to claim 12, wherein the positional information is a mesh code or grid square code indicating an area in which the mobile object is located.

14. The wireless communication control apparatus according to claim 13, wherein the communication control unit selects the one communication method from among the multiple communication methods based on the communication method selection policy set by a user.

15. The wireless communication control apparatus according to claim 13, wherein the processing unit transmits the collected communication state information to a communication state managing server via a wireless network with the use of the wireless communication device for which the control information has been set.

16. The wireless communication control apparatus according to claim 15, wherein the processing unit demands acquisition of the communication state information correlated with the positional information indicating the current position of the mobile object from the communication state managing server when the communication state information is not stored in the storage device.

17. A wireless communication control method for a mobile object, the method comprising the steps of:

collecting the communication state information correlated with the positional information indicating the current position of the mobile object for each of multiple communication methods that can be selectively set for a wireless communication device;

selecting one communication method from among the multiple communication methods with reference to the collected communication state information; and setting control information for the wireless communication device, the control information being used for the communication according to the one communication method selected.

18. The wireless communication control method according to claim 17, wherein the one communication method is selected from among the multiple communication methods based on a judgment as to whether or not at least either of two ratios meets a predetermined condition, one of the two ratios being the ratio of the communicable time during which communication is possible with each of the multiple communication methods on the expected traveling path of the mobile object from a first geographical location to a second geographical location to the traveling time required for the mobile object to travel the expected traveling path, the other of the two ratios being the ratio of the communicable distance within which communication is possible with each of the multiple communication methods on the expected traveling path of the mobile object from the first geographical location to the second geographical location to the traveling distance of the mobile object on the expected traveling path.

19. The wireless communication control method according to claim 18, wherein the multiple communication methods are multiple communication speeds.

20. The wireless communication control method according to claim 19, wherein the communication state information indicates that the communication at a communication speed set for the wireless communication device is either successful or unsuccessful.

21. The wireless communication control method according to claim 20, wherein the positional information is a mesh code or grid square code indicating an area in which the mobile object is located.

22. The wireless communication control method according to claim 21, wherein the one communication method is selected from among the multiple communication methods based on the communication method selection policy set by a user.

23. The wireless communication control method according to claim 21, wherein the collected communication state information is transmitted to a communication state managing server via a wireless network with the use of the wireless communication device for which the control information has been set.

24. The wireless communication control method according to claim 23, wherein the communication state managing server is requested to provide the communication state information correlated with the positional information indicating the current position of the mobile object.

* * * * *